(12) United States Patent
Kaminski

(10) Patent No.: US 10,924,350 B1
(45) Date of Patent: Feb. 16, 2021

(54) SOFTWARE SENSOR FOR REPORTING CONTROLLER METRICS

(71) Applicant: Amazon Technologies, Inc., Reno, NV (US)

(72) Inventor: Ashley Kaminski, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 485 days.

(21) Appl. No.: 15/629,104

(22) Filed: Jun. 21, 2017

(51) Int. Cl.
| | |
|---|---|
| H04L 12/24 | (2006.01) |
| G06F 11/30 | (2006.01) |
| G06F 11/07 | (2006.01) |
| G06F 9/455 | (2018.01) |
| G06F 11/22 | (2006.01) |
| G06Q 10/06 | (2012.01) |

(52) U.S. Cl.
CPC ...... *H04L 41/0896* (2013.01); *G06F 9/45558* (2013.01); *G06F 11/0748* (2013.01); *G06F 11/2273* (2013.01); *G06F 11/301* (2013.01); *G06F 11/3006* (2013.01); *G06F 11/3058* (2013.01); *G06F 11/3065* (2013.01); *G06Q 10/06375* (2013.01); *H04L 41/0823* (2013.01); *G06F 2009/45591* (2013.01)

(58) Field of Classification Search
CPC .. G06F 11/2273; G06F 11/2294; G06F 11/30; G06F 11/07; G06F 11/0706; G06F 11/0757; G06F 11/3055; G06F 11/3089; H04L 41/0823; H04L 41/0896; G06Q 10/06; G06Q 10/0635; G06Q 10/06375; G06Q 10/063112
See application file for complete search history.

(56) References Cited

U.S. PATENT DOCUMENTS

| | | | |
|---|---|---|---|
| 10,289,510 B1* | 5/2019 | Janeczek | G06F 11/2273 |
| 2008/0126171 A1* | 5/2008 | Baldwin | G06Q 10/06375 |
| | | | 705/7.14 |
| 2014/0289570 A1* | 9/2014 | Lewis | G06F 11/3089 |
| | | | 714/43 |
| 2014/0379889 A1* | 12/2014 | Faraboschi | H04L 41/0896 |
| | | | 709/224 |

* cited by examiner

*Primary Examiner* — Kyung H Shin
(74) *Attorney, Agent, or Firm* — Hogan Lovells US LLP

(57) ABSTRACT

Various approaches provide for communicating management controller performance metrics, such as status information associated with the controller, to a remote requestor. For example, a first software function including a second software function as a callback function determines a performance metric associated with a status of the controller. In response to executing the first software function, the second function identifies the performance metric of the controller by parsing performance data generated by the controller during operation. The performance metric is restricted to communication via a non-network port. The performance metric is converted to a format associated with sensor data of a component monitored by the controller. Thereafter, the controller recognizes the converted performance metric as sensor data and communicates the converted performance metric as sensor data to the remote requestor via a network port.

20 Claims, 6 Drawing Sheets

SOFTWARE SENSOR FOR REPORTING CONTROLLER METRICS

BACKGROUND

Computers or computing devices utilize a communication network, or a series of communication networks, to exchange data. Companies and organizations operate computer networks that interconnect a number of computing devices to support operations or provide services to third parties. Such computing devices may be located in a single geographic location or may be located in multiple and geographically distinct locations (e.g., interconnected via private or public communication networks). For example, data centers or data processing centers (generally referred to as a data center) include a number of interconnected computing systems to provide computing resources to users of the data center. Data centers may include private data centers operated on behalf of an organization or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, a single physical computing device creates, maintains, deletes, or otherwise manages virtual machines in a dynamic manner. In turn, users request computer resources from a data center, including single computing devices or a configuration of networked computing devices, and are provided with varying numbers of virtual machine resources responsive to the request.

Controllers, such as a Baseboard Management Controller (BMC) are provided to track the status of the hardware resources in a data center. Accordingly, the hardware may be monitored to determine whether the hardware is overworked, underworked, and/or to otherwise identify the status of the hardware within the data center. Thus, the use of a BMC to track the use of the hardware resources provides data center administrators with the ability to determine problems or usage levels, and to fix any issues that may arise. However, the BMC itself is generally not accessible to a data center administrator over a network connection and thus generally requires manual status updates by administrators within the data center. Accordingly, there is a need to allow a BMC to be accessed remotely to evaluate operational parameters of the BMC itself.

BRIEF DESCRIPTION OF THE DRAWINGS

The detailed description below is supported, in various embodiments, by the drawings accompanying this detailed description, and which is briefly described as follows.

DETAILED DESCRIPTION

Figure 1:
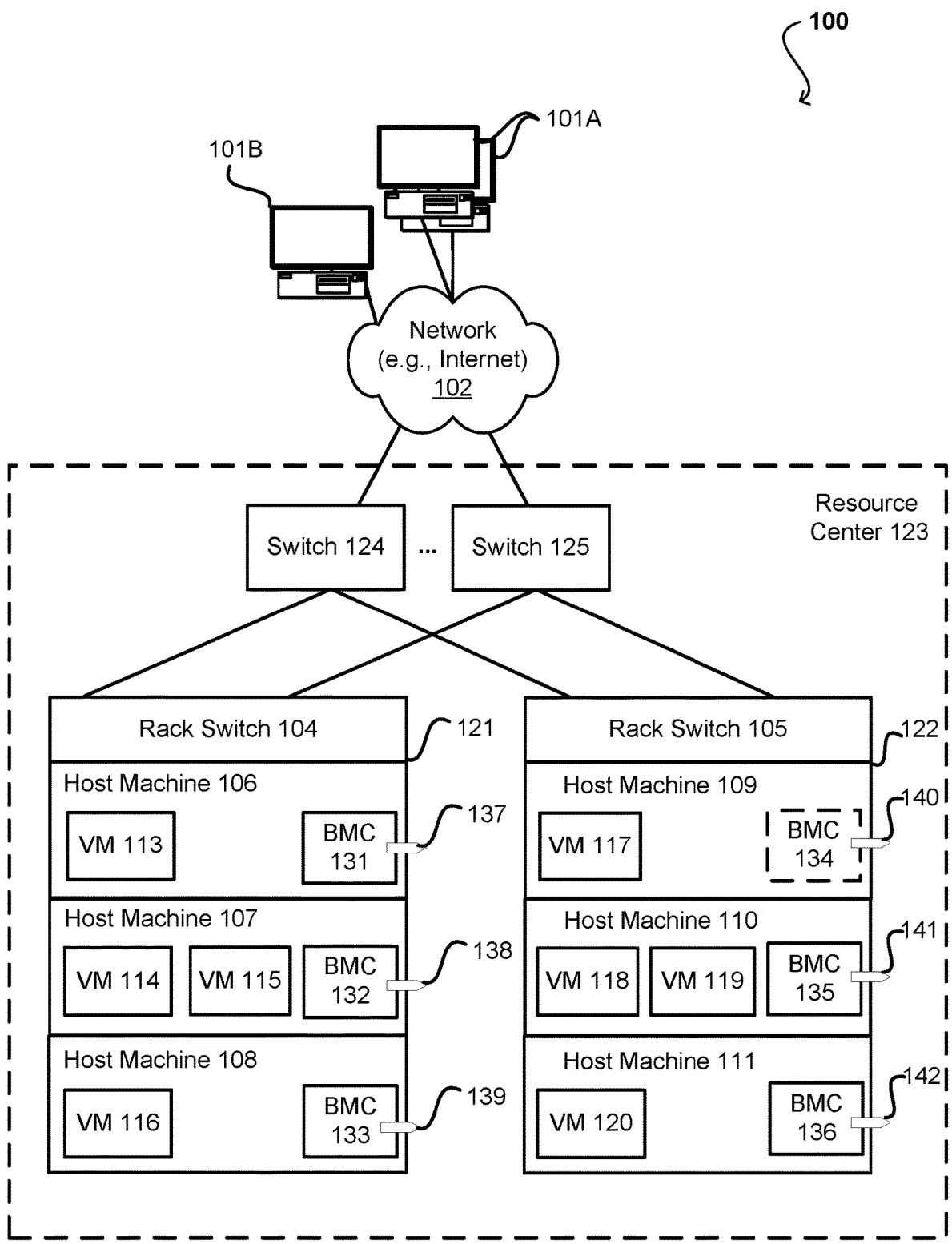
FIG. 1 illustrates an example architecture of a data center in communication with user devices in accordance with an embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Systems and methods in accordance with various embodiments of the present disclosure may overcome one or more of the aforementioned and other deficiencies experienced in conventional approaches to remote management of data center components. In particular, various embodiments are directed to enabling administrators to securely obtain an operational status of a BMC from a data center or resource center without requiring local access at the BMC.

A baseboard management controller (BMC) is a service processor that monitors the physical state of one or more hardware devices using sensors and communicating with a system administrator through an independent connection. The BMC manages the operation of one or more host computing device within a data center in accordance with a platform management framework, such as the Intelligent Platform Management Interface (IPMI) system, for example. (Although various embodiments of the disclosed technologies are described with reference to the IPMI system or the IPMI framework, other platform management frameworks may also be used.) The BMC may include a network port for providing sensor data from various server components to a remote device using the IPMI framework. The BMC is part of the IPMI system and performs monitoring functions, including monitoring the status of hardware components using one or more hardware sensors, and reporting sensor data and error conditions to an administrator console. However, the BMC does not allow remote access to performance metrics of the BMC itself in the same manner as the sensor data. Instead, the BMC provides a local (e.g., non-network) port for reporting performance metrics of the BMC to a requestor, when the requestor is physically connected to the non-network/local port of the BMC. Accordingly, it can be time-intensive and costly to monitor to the status of the BMC as a network administrator usually must physically connect to the BMC in order to obtain performance information about the BMC. As data centers become larger, it is difficult to monitor the status of the thousands or more BMCs that may be present within the data center which can lead to performance failures of BMCs that are not being monitored properly. Accordingly, there is a need to be able to remotely monitor the status of the BMC in order to avoid security and performance problems presented by overtaxed and/or malfunctioning BMCs.

Methods, systems, and/or devices for remotely monitoring and obtaining performance metrics for a BMC using the existing IPMI framework are provided in accordance with various embodiments. For example, an embodiment is directed at methods that obtain BMC performance metrics and map the performance metrics, for the BMC, as sensor data for reporting using the IPMI framework. The performance metrics may then be accessible remotely via a network port as the performance metrics may be passed using the IPMI protocol, as if the performance metrics were sensor data from a hardware sensor. As such, various embodiments may use the existing IPMI framework to pass traditionally secured BMC performance metrics as hardware sensor data to a remote network administrator for monitoring.

For example, in an exemplary embodiment, a first software function is registered for the BMC. The first software function may be a function recognized under the IPMI protocol as an IPMI function, command, or message. The first software function may be registered in a sensor registry associated with the BMC and the first software function may be configured to include a second software function that functions as a callback function. The second software function may be a command or message for performing callback functions. The second software function operates to obtain the performance metrics of the BMC. The first software function may be initiated to determine a performance metric associated with a status of the BMC. The performance metric, as previously noted, is restricted in communication from the BMC via a non-network port. The exemplary implementation initiates the second software function that is configured to obtain and/or parse the performance metric from performance data or stored files generated by the BMC during operation of the BMC. The performance metric may be mapped and/or converted to sensor data that is configured to be reported using the IPMI reporting framework and can be reported to the remote administrator station or terminal using the traditional reporting functionality. Accordingly, the performance metric may be converted, mapped, or represented to a format associated with sensor data, which is recognizable by the BMC for communicating via a network interface. Thus, the sensor data can be available for reporting, via the network interface associated with the processor, to a remote requestor outside the BMC. Accordingly, various embodiments allow for secure local files or data associated with performance metrics of the BMC device to be converted and reported remotely using existing communication protocols of the BMC.

Approaches in accordance with various embodiments can provide numerous advantages including, but not limited to, allowing remote access to BMC performance metrics that previously would have required a manual or local analysis by a data center administrator. Further, at least some embodiments use the existing infrastructure and communications protocols of a BMC. Accordingly, various embodiments can be implemented with reduced or minimal software updates on the BMC. As such, approaches in accordance with various embodiments provide methods to allow remote access to the previously generated and tracked BMC performance data while using the existing protocols of the BMC and avoid having to design and/or implement updates to the existing operation of the BMC.

FIG. 1 illustrates an exemplary architecture 100 of a data center or resource center 123 in communication with user devices (e.g., computers 101A-101B) in accordance with an embodiment. In the example architecture, various resources are deployed in a resource center 123 of a service provider. The resource center 123 includes a number of racks (121, 122) of host machines or servers. All of the server devices in each rack may be connected to the same top-of-rack (TOR) switch (e.g., 104, 105). In an example, host machines, computing devices, or servers (106, 107, 108) are each connected to TOR switch 104, while host machines (109, 110, 111) are each connected to TOR switch 105. The TOR switches 104 and 105 can be in turn connected to other switches, such as switches (124, 125). The switches (124, 125) are, in turn, connected to an external network 102, such as the Internet. Switches (124, 125) provide redundant connections to the external network 102.

In an example implementation, there are multiple switches between each rack of servers to provide redundancy or to achieve a particular network topology. Two switches (124, 125) are provided merely in an example manner. Further, when the resource center implements a Clos network topology the topology would include a number of layers, where each layer has a number of switches and each switch has a number of ports. A switch on the edge layer of such a network would have half of its ports going to other switches, while a switch in the middle layer of the network would have all of its ports connected to other switches. Any number of such network topologies is possible within the scope of the present disclosure.

In the example hardware of FIG. 1, the resources for the resource center 123 include host servers or machines, and cluster instances, for example. For resources such as cluster instances users or customers of a service provider associated with the resource center 123 are provided native access to a subset of the hardware resources. Accordingly, in such an example, the customers have access to peripheral devices connected using a component such as a peripheral component interconnect ("PCI") bus. These peripheral devices include network interface cards (NICs), graphics processing units ("GPUs"), and other similar devices that are apparent as capable of being virtualized in a hosted computing environment. In another example, a user or customer has full access to an entire machine, or groups of machines, including any or all devices incorporated therein. For access to one group of machines, such as a rack of servers, a user might be granted substantially full access to the entire rack—including to any switches or other devices or components provided as part of the rack. Such embodiments can be generally referred to as "bare metal" instances.

In accordance with an illustrative embodiment, a service provider can maintain one or more host machines, servers, or computing devices which may be utilized as bare metal instances by one or more customers of the service provider. Illustratively, each host machine includes hardware components that are configured in a manner to allow the service provider to implement one or more management processes upon a power cycle of the host machine and prior to access of the host machine resources by customers. In one aspect, the present disclosure relates to an offload engine component, baseboard management component (BMC) and various hardware latches arranged in a manner to limit modifications to software or firmware on hardware components, such as System Basic Input/Output System (SBIOS), hard drives and hard driver controllers, peripherals, and the like. In another aspect, the present disclosure relates to securing performance metrics of the BMC of each of the host machine and to provide such performance metrics to a remote requester, such as a service provider that is independent of the customer processes.

In various embodiments each host machine can host a number of virtual machine (VM) instances (113-120), which are provisioned for the various users. Some host machines or servers may host a single virtual machine instance, while other servers may host multiple VM instances. For example, in FIG. 1, host servers (106, 108, 109, 111) each host a single VM instance (113, 116, 117, 120) while host servers (107, 110) each host multiple VM instances (114, 115, 118, 119). Users who own the various VM instances can connect to the resource center 123 over the internet 102, and can use the interface described throughout this disclosure to specify constraints and manipulate the operational features of their VM instances.

The service provider can optimize the VM placement (host selection) and settings (e.g., VM settings, physical hardware settings, software settings, firmware settings, etc.) to satisfy the specified constraints. In various embodiments, the satisfaction of these constraints can be carried out by manipulating any number of settings and placement logic. Further, the VM instances (e.g., reference numerals 205-207) discussed herein are hosted on the host machines 201 using a hypervisor 203 (or other virtualization technology) and each VM instance 205-207 may contain a guest operating system (OS). Further, in aspects, the guest OS includes a kernel, device drivers and other OS components. The host machines 106-111 and other physical resources to host the virtual machines are usually provided by the service provider (or other operator of the environment) and reside in resource centers, such as a data centers, server farms, content delivery network (CDNs) points-of-presence (POPs) and the like. The host machine 201 further includes, apart from hypervisor 203, a host domain (e.g., DOM-0 204) having direct access to the one or more processors in the hardware 202, and one or more unprivileged domains that have virtualized access to the one or more processors in hardware 202 of the host machine, and which run customer-provided code.

FIG. 1 also demonstrates that each host machine 106-111 includes at least a corresponding BMC 131-136. The BMCs 131-136 include respective non-network ports 137-142. The non-network ports 137-142 enable a local interface, in the data or resource center 123, to connect a terminal to obtain BMC status information. The BMC status information includes performance metrics for the BMC. In an implementation, such performance metrics include at least one of: the processor usage, the processor utilization, and the memory status. This list is not exhaustive and any other relevant information related to the BMC may be stored and reported as a performance metric of the BMC. The processor usage refers to a measure of an amount of active processing occurring in the processor at the time the measure is recorded. For example, the processor usage is 50% if 50% of the processor's capability is actively involved in a processing task. The processor utilization refers to a measure of the processing occurring in the processor over a defined time period. For example, a processor utilization of 50% indicates that the processor averages 50% of its maximum processing capabilities over a period of time. In such an example, the processor could have exceeded 50% usage over a portion of the period of time, and could have usage of below 50% for a remaining portion of the period of time, while averaging 50% over the period of time. The processor usage may be seen as an absolute measure of the CPU processing capabilities, while the utilization may be seen as a relative measure (in time) of the CPU processing capabilities. The processor associated with each BMC is configured to recognize that the performance metric is restricted for communication to a local requestor via a non-network port (e.g., 137-142). As explained above, however, the processor associated with each BMC 131-136 is also configured to recognize that sensor data received from hardware sensors coupled to each BMC 131-136 is available for transfer to a remote requestor via a network port. Accordingly, in addition to the local interfaces 137-142, each BMC includes network interfaces that allow a remote requestor to receive sensor data from the BMC.

In an embodiment, each host machine includes multiple and varying sensors that are either added or built into the hardware of the host machine. The sensors (not shown) report to the BMC 131-136 for a wide range of sensor information, as to the connected host machine, such as temperature of one or more components (e.g., processors), fan speeds, power status, server operating system status, memory status, etc. In an example, each BMC 131-136 is configured to monitor the above mentioned sensors and is configured to alert an administrator when an error threshold or sensor threshold is met. The alerts for the sensor data may be provided via a network interface card. When any of the sensor information strays from predetermined limits, there is typically a potential for system failure. Accordingly, an administrator, with the knowledge of the alerts may intervene and make required corrections to bring the components back to within predetermined limits for monitored functions of the components. In various embodiments discussed herein, the administrator is able to monitor the alerts and make the required correction in a remote manner, outside the BMC or the data center 123.

Each of the BMCs 131-136, on each server 106-111 or rack 104-105, includes interfaces to communicate data with other devices or components. For example, the BMCs may include system management buses (SMBuses), Recommended Standard 232 (RS-232) ports, which are serial interfaces, address and data lines, and an Intelligent Platform Management Bus (IPMB), which communicates the IPMI requests between the BMC and management controllers in a system that includes the servers or racks. Further, a serial direct connection port is provided on the BMC to allow non-network connects to communicate with the BMC externally. The serial direct connection port is secure because it requires a direct physical connection with a local computing device for access to the specific BMC. The direct physical connection is different from the networked ports which are available to provide sensor data from the BMC's monitoring of server components in a remote manner. Connection to the BMC over LAN may or may not use encryption depending on the security concerns of the user.

The BMC is accessed via a standard protocol including instructions (i.e., IPMI, for example) that allow administrators and components to interface. The IPMI is a set of interface protocols that provide specifications helpful in management and monitoring of the BMC connected components. For example, when the BMC is connected to server (e.g., host machines 106-111), the server's CPU, firmware (e.g., Basic Input/Output System (BIOS), Unified Extensible Firmware Interface (UEFI), etc.), and the operating system (OS) are in communication with the BMC. The IPMI may define the set of interface protocols in a manner that enables administrators to communicate via out-of-band (OOB) pathways with the BMC, to external computing devices, to provide information from monitoring the server components. In a further implementation, the IPMI enables the BMC to manager servers that are unresponsive or powered off. In such implementations the IPMI uses network connections to the server components instead of interfacing with the OS or shell of the server incorporating the server components.

In a further implementation, the IPMI is structured as a message-based interface for the BMC, with additional hardware interface specifications. The IPMI may be capable of using its message-based processes to communicate with the BMC in order to manage servers that are unresponsive or powered off. In an example of unresponsive servers, an OS failure, a system failure, or a pre-booting process will render a server unresponsive to external requests because it is incapable of resolving such requests. In such cases, the IPMI allows interfacing directly with the server hardware via the BMC instead of remote login using secure shell (SSH), which is recognized as an in-band pathway.

Administrators for an unresponsive server use the IPMI messaging feature to monitor status of various server components including component temperatures, fan speed or status, component voltages, power supplies, and intrusion. The IPMI messaging is also available to review sensor logs from these relevant components and to provide alerts sensor data that stray from predetermined performance conditions as previously described. Additionally, the IPMI is available for use via the BMC to perform recovery of such unresponsive servers. In an example, the IPMI can request system reboot or power-down, and can even change or adjust timers, such as a hardware timer that auto-generates system reset features. The IPMI standard supports the alerts process for the BMC using a simple network management protocol (SNMP) for following the platform even trap (PET) specification.

In an example implementation, the BMC uses the IPMI protocols to communicate via the serial interface, over a local area network (LAN), to a receiving terminal. Such communication pertains to the status or management of the server components. Such a server implementing the BMC is enabled for out-of-band (OOB) or side-band interface functionality. In an implementation, the side-band interface for LAN relies on a network interface, such as a network interface controller (NIC). In instances where a server is in normal operations, the BMC may use the IPMI framework to provide component sensor data to system management software. In an alternate implementation, a Data Center Management Interface (DCMI) is available to function via a controller, such as the BMC, of the present disclosure. Like IPMI, the DCMI is a framework that is partly based on IPMI, and more suited for data center management. The DCMI may use interfaces from the IPMI with reduced options, but with control as to power capping to cap the power consumption of an associated server.

In some cases, the BMC is a controller sub-system of the IPMI system. Additionally and/or alternatively, other controllers for other component modules are provided to work with the BMC. Such other controllers are located within the rack of the BMC and connect to the BMC via various standard protocols. In an example of a standard protocol for BMC to controller communication, an Intelligent Platform Management Bus/Bridge (IPMB) is available. The IPMB may be an implementation of Inter-Integrated Circuit ($I^2C$) framework. The BMC also connects to the other controllers or to another BMC in another rack via an Intelligent Platform Management Controller (IPMC) bus or bridge.

In an example, the BMC includes a field replaceable unit (FRU) that is a repository that holds information of the BMC and sensor providers—including, at least manufacturer information. Further, a sensor data record (SDR) is a repository that provides the properties of the individual sensors interfacing with the BMC. For example, each additional sensor added to a server is first registered, via the BMC, to the SDR. Accordingly, the SDR information is used to determine which sensors to query to receive sensor data.

The architecture 100 is also a virtual network that includes the multiple host machines 106-111. Illustratively, each host machine includes a number of hardware and software components, examples of which will be described, in part, with regard to FIG. 2. Illustratively, the VM instances 113-120 may be configured to provide specific functionality associated with the components of a hosted network or simulation of the components of the hosted network. Examples of the types of desired functionality, include but are not limited to: database management, serving or distributing data or content (e.g., web servers), managing load balancing or network resources, managing network connectivity or security, providing network addressing information, managing client or server redirection, or any other functionality associated with a data center. Additionally, one or more VM instance may be provisioned generically when a desired functionality is not specified or is otherwise not available. One skilled in the relevant art will appreciate that the virtual network in FIG. 1 is logical in nature, but encompasses host machines 106-111 in a different geographic region.

With continued reference to FIG. 1, network 102 provides, for instance, a wide area network (WAN), a local area network (LAN), or a global communications network. In some instances, the client computing devices 101A-101B interacts with the network 102 to request the allocation of one or more hosted machines 106-111 on behalf of the customer. Additionally, the network 102 may be integrated with other hosted client computing networks.

Figure 2:
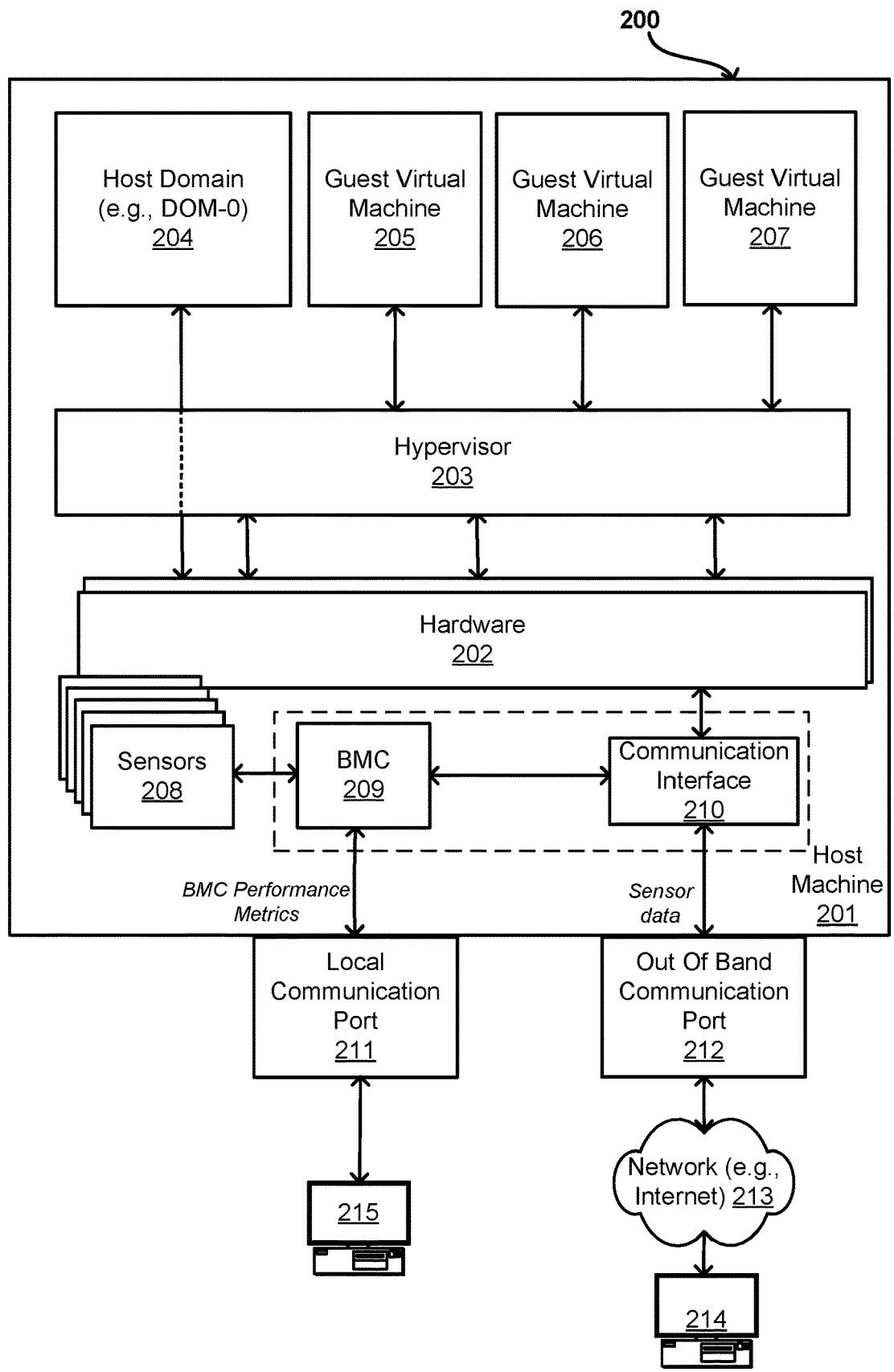
FIG. 2 illustrates an example host machine or host computing device portion of FIG. 1, for performing the present disclosure, in accordance with an embodiment.

FIG. 2 illustrates an example of a host machine 201, also referred to as the host machine, server, or computing device 106-111 portion of FIG. 1, for performing the present disclosure. The block diagram in FIG. 2 provides illustrative components 204-212 associated with any one of host machines 106-111. One skilled in the relevant art, however, will appreciate that the disclosed components are illustrative and not meant to be an exhaustive identification of all the components required by a host machine 201. Rather, these illustrative components have been identified, in a non-limiting manner, to facilitate illustration of one or more aspects of the present application. Still further, the illustrative components of the host machine 201 can be considered logical, such that the physical implementation of one or more components can be varied or such that one or more of the logical components may be implemented in a virtualized manner. Additionally, one or more host machine 106-111 can share one or more of the illustrated components, such as processors, graphical processing units, memory and the like.

In an illustrative embodiment, each host machine is associated with various hardware components, software components and respective configurations that facilitate the implementation of host computing device boot process, which will be described in detail below. In one embodiment, the host machine 201 includes a bare metal hosting platform 200 for managing various functions associated with bare metal host machines. In an example, the bare metal hosting platform 200 includes a host domain 204, guest VMs 205-207, a hypervisor 203, a hardware layer 202, sensors 208, a communication interface 210, a local communication port 211, an out of band communication port 212, storage (not shown), and a BMC 209. The BMC 209 is for managing operations of the host machine 201 in accordance with the IPMI system. For example, the BMC 209 includes an embedded processor (not shown) that interfaces between system management software and the components 202-208, 210-212 of host machine 201. Further, the BMC 209, in an aspect, may include the communication interface 210, illustrated in FIG. 2 by a dotted enclosure that makes the BMC 209 and communication interface 210 integral or co-extensive.

In an example, the BMC 209 is in communication with the sensors 208 and is in communication or integral with the communications interface 210 that provides a standard communications bridge between physical and emulated components 202-208, 210-212 of the host machine 201. The communication interface 210 provides network connectivity to communicate sensor data from sensors 208 to remote devices via the out-of-band (OOB) port 212. An offload engine (not shown) of the communications interface 210 is designed for network interface cards (NIC) to offload processing of transmission control protocol/internet protocol (TCP/IP) information to the network controller. In an implementation, the BMC 209 controls communication of sensor data via the offload engine of the communication interface 210, which may include one or more processors to perform communication tasks.

The processor of the BMC 209, in one example, executes computer-executable instructions related to the implementation of management functions or the management of one or more such management functions, or to execute other computer-executable instructions related to the implementation of sensor processes. Illustratively, the BMC 209 may be electrically isolated from any other component in the bare metal hosting platform 200 other than the communications interface 210.

A local communication port 211 may also be in communication with the BMC 209. The local communication port 211 may be configured to establish communication channels between the bare metal hosting platform 200 and a local terminal 215 that may be physically coupled to the BMC through the local communication port 211. The local terminal 215 may be physically located in the data center. Additionally, in some embodiments, an offload engine of the communications interface 210 may be one or more network-based services or other computing devices that support external communication for the BMC 209 via the OOB communication port 212. For example, the OOB communication port 212 may include an external communication port that corresponds to a communication channel implemented in accordance with The Onion Router ("TOR") communication protocol and scheme.

In some embodiments, the communications interface 210 may also be in communication with an SBIOS. In such an example, the SBIOS includes non-transitory executable code, often referred to as firmware, that is executed by one or more processors and is used to cause components of the host computing device 201 to initialize and identify system devices such as the video display card, keyboard and mouse, hard disk drive, optical disc drive and other hardware. The SBIOS may be external to the BMC and coupled to the communications interface 210, as well as the hardware of the host machine 201. The BMC 209 is illustrated, in FIG. 2, as in communication with sensors 208. The BMC may use private management buses or the IMPB to communicate with sensors 208 on various components of hardware 202.

With continued reference to FIG. 2, the SBIOS component of the communication interface 210 is coupled to (or in communication with) a number of additional components of the hardware 202, such as central processing units (CPUs), memory (e.g., RAM), and the like. In one embodiment, such components of hardware 202 may be physical computing device resources in communication with other components via various hardware communication channels. These communication channels can correspond to a communication bus, such as PCI bus in which the components of the bare metal hosting platform 200 communicate in accordance with the PCI standards. Other types of communication channels, communication media, communication buses or communication protocols (e.g., the Ethernet communication protocol) may also be utilized. Additionally, in other embodiments, one or more of the components may be virtualized hardware components emulated by the host computing device 201. In such embodiments, the offload engine of the communications interface 210 implements a management process in which a host machine 201 is configured with physical or emulated hardware components based on a variety of criteria. The components of the host machine 201 may communicate with the offload engine of the communication interface 210 via one of the above mentioned communication channels.

Also in communication with an offload engine of the communication interface 210, via the communication channels, are one or more controller components for managing hard drives or other forms of memory, as part of hardware 202. Examples of controller components include a SATA hard drive controller. The host machines 201 can also include additional components that are in communication with one or more of the illustrative components associated with a bare metal hosting platform 200. As illustrated in FIG. 2, such components are part of hardware 202 and can include devices, such as one or more controllers (as noted above), in combination with one or more peripheral devices, such as hard disks or other storage devices and Graphics Processing Units (GPUs).

Also, in FIG. 2 one or more components 202-207 of a bare metal hosting platform may be shared among host machines 106-111. For example, each host machine 106-111 includes one or more components of a bare metal hosting platform, as illustrated at 200. In one example, however, a set of host machines 106-108 are in communication with an external component 134 in host machine 109 that includes the BMC 209 and communication interface 210 with its offload engine. As shown in FIG. 1, the BMC 134 is marked with broken lines indicating that it may be internal or external to the host machine 109. Accordingly, in an example, the BMC 134, 209 and offload engine are configured as an external component to host machine 109, and performs at least a subset of the functions previously described with regard to the bare metal host platform 200 for securing sensor data and for communicating the sensor data via communication interface 210. Further the BMC 134, 209 and offload engine of the communication interface 210 are implemented such that individual host machines (e.g., 106-108) do not need a corresponding local BMC (i.e., 131-133) or the offload engine. Alternatively, the BMC 134, 209 and offload engine of the communication interface 210 are redundant to any local BMC or offload engine, or work in conjunction with a local BMC or offload engine.

In another implementation, a set of host machines 106-108 are in communication with an external component, different from BMC 134, and that includes only an offload engine in a communications interface. In this example, the offload engine is in communication with BMCs 131-133, which are local to host machines 106-108 or otherwise shared by the host machines 106-108. In another example, the external components may establish communication with the set of host machines 106-108 via a variety of communication media implementing one or more communication protocols, as previously described herein. Additionally, in yet another example, the external components may also implement or incorporate additional or alternative security methodologies, architectures or protocols with regard to communications with the host machines 106-108.

In an embodiment, the external components described above are logical components that are implemented remotely from the host machines 106-108, or implemented in a distributed manner such that there would be multiple instances of the external components. Additionally, while the external components correspond to a shared BMC 134 and offload engine, additional components may be also be shared by one or more host machines 106-108 as previously discussed.

The example host machines 106-111 incorporate a boot process during startup. Such a boot process may include a power up cycle initiated by the BMC 209. The boot process is also available to register new sensors to the BMC. Alternatively, the new sensors are added via a pre-boot process, where a local terminal is able to connect to the BMC and is capable of transferring relevant sensor information to the BMC to indicate that a new sensor is being added. In an example, the registration of new sensors is by flashing or hardcoding the new sensor information and corresponding software functions to the BMC. In such a process, the FRU is updated to include the new sensor information. The SDR may be adjusted to include an area to receive sensor data for the newly added sensor. The power up cycle, in an aspect, is part of the completion of the utilization of the host machine 201 by a previous customer. Further, the BMC 209 also participates in a determination that host machine 201 may need re-provisioning or re-configuring, after completion of an update process, for example.

As part of the power up cycle (or upon completion of one or more processes as identified above), an offload engine in the communication interface 210 initiates all the related communications components. The CPU of hardware 202 communicates with a SBIOS part of the communications interface 210 to obtain executable code and to implement a boot process, such as a pre-boot execution environment (PXE) boot. The PXE, in an example, is an environment available to register the new sensor information for a BMC. Further, the offload engine in the communication interface 210 is configured to present itself as a boot device, such as a NIC, so that the CPU of hardware 202 implements the boot process through the offload engine. The offload engine in the communication interface 210 delays the implementation of the requested boot process, in an example. The offload engine may include an optional Read Only Memory (ROM) process that is applicable to delay the boot process until the intended boot sequence is ready for initiation. In another example, the offload engine in the communication interface 210 can calculate or implement a timed delay process to allow sufficient time for one or more management functions to complete prior to proceeding with the boot request.

With the BMC 209 in boot sequence, initialization of its processor begins with the execution of one or more management functions. For example, the BMC 209 executes code that causes the offload engine to provide one or more management functions. In another embodiment, the offload engine of the communications interface 210, via control of the BMC 209, initiates one or more services or communicates with other host machines that implement executable code corresponding to one or more management functions.

In addition to the management functions, the BMC 209 also implements one or more processes for preparing the host machine 201 for use with the customer specified request. In one aspect, the BMC 209 enables one or more physical or emulated hardware components for utilization. In another aspect, assuming that host machine 201 includes four processing units in hardware 202 that are capable of being utilized, and when a customer has only indicated they would utilize two processing units, such configuration is processed via the BMC 209 alone or with an additional component, such as the offload engine. Accordingly, the BMC 209 with or without the offload engine enables two of the processing units responsive to the request. In another aspect, the BMC 209 initiates one or more processes that will be run by the service provider during the time the host machine 201 resources are being utilized by a customer. For example, the processes of the BMC 201 can include a health check module for determining the relative health/operation of the host machine 201. In other aspects, the power up is initiated by a customer request or service provider request, when the BMC 209 (optionally, through the offload engine) facilitates such interfaces. For example, the BMC 209 initiates the power up based on an application programming interface (API) exposed to a client computing devices 101A-101B.

While the BMC 209 is provided to at least monitor status information from sensors 208 distributed throughout the hardware 202, it is noted that the BMC 209, itself, is an important feature of each host machine 206-211. Accordingly, the status of the BMC 209 is monitored and made available remotely in an aspect herein. In an implementation, BMC 209 is a controller that includes a processor on a server board, such as a printed circuit board (PCB). While the BMC 209 provides aspects of sensor monitoring to control fan speed, monitoring temperature sensors, among other features detailed above, it also stores performance metrics in the BMC as to its own performance. When the BMC 209 is active in a resource center 123, it is generally not responsive to communication for the performance metrics, but can provide the sensor data remotely. Access to the BMC 209 is, however, applicable using the IPMI system with corresponding instructions protocol and using an IPMI tool on a terminal connected to the BMC 209. For example, using the IPMI tool, an instruction to return the sensors would return a list of all the sensors that the BMC records. Similarly, a request through the IPMI to return a system event log will cause the BMC to return the system event log.

The above processes for a BMC in an active data center, however, do not provide an indication of the BMC status itself—only of the components connected to the BMC. In the above example, sensors 208 are responsive to the BMC instructions and event logs relating to the sensor events, and such sensor events are available remotely via the communications interface 210 to OOB communication port 212 and, subsequently, through the internet 213 to a remote terminal 214. To find the status or performance metric of the BMC 209—including the processor usage, processor utilization, and free memory available on the BMC, a terminal 215 may be locally connected (e.g., physically connected) to the BMC via the local communication port 211, representing a non-network port. When the BMC 209 is busy processing and is unable to process any incoming commands, it is difficult to access the status of the BMC 209.

Figure 3:
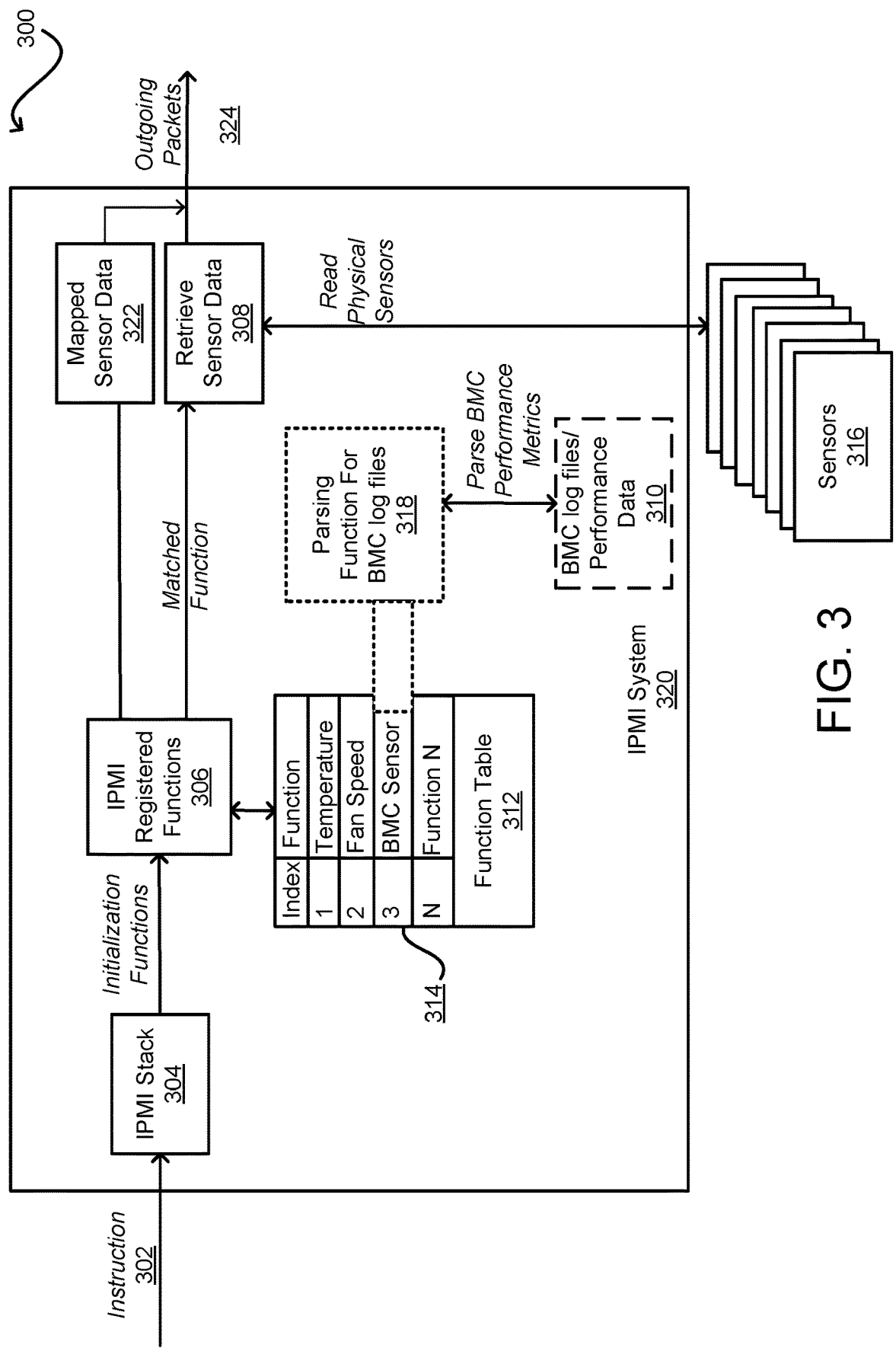
FIG. 3 illustrates an example process flow using a function table to provide software functions to remotely obtain and report performance metrics of a BMC in accordance with an embodiment.

FIG. 3 illustrates an example process flow 300 that uses function table 312 for initializing a software function in order to remotely obtain performance metrics associated with the BMC using existing communication protocols in accordance with an embodiment. At step 302, when the BMC boots up, an instruction may be issued to the IPMI stack in block 304, which represents the BMC's internal software for responding to and managing components and features. The IPMI stack in block 304 may initialize the functions to determine the IPMI registered functions associated with the IPMI system block 320. The instruction in step 302 may be provided from a remote or local terminal connected to the BMC 209 via the local communication port 211 or the OOB communication port 212.

The IPMI stack in block 304 initializes the IPMI registered functions 306 by identifying a function table 312 (or other storage structure) that stores the various functions that the BMC is configured to execute. As previously provided, the registered functions may be flashed or loaded into the BMC 209 via a pre-boot process. The function table 312 may include the registered functions that allow the BMC to retrieve sensor data via block 308 from one or more sensors blocks 316 coupled to the BMC. The function table 312 may identify the type of information to obtain from one or more sensors and/or the sensor to obtain the requested sensor information from. Accordingly, each of the functions, in function table 312, may be associated with one of the hardware sensors in blocks 316 and may be configured to cause the BMC to retrieve sensor data or information from at least one of the hardware sensors 316, via block 308, that is associated with the selected function. The retrieved sensor data from block 308, corresponding to one or more sensors, is provided as outgoing packets of information in step 324.

The retrieved sensor data in block 308 includes sensor information in a data structure format that is recognizable in the BMC for remote communication. In some embodiments, each of the sensors of blocks 316 may include a memory area dedicated to storing its corresponding sensor information. As the sensors are initialized at the boot phase, the sensors secure their sensor information for the BMC after the boot process is complete. In an example, the IPMI registered functions, via block 306, are caused to initiate from the function table 312 in an automatic and pre-scheduled manner. As a result, each registered function causes retrieval of corresponding sensor data, via block 308, from sensors in blocks 316 in the pre-scheduled manner for provisioning in the outgoing packets of step 324. The functions in function table 312 are generally referred to herein as first software functions. In an aspect of the present disclosure, the functions in function table 312 are updated to include a BMC sensor function, e.g., BMC sensor function 314. The BMC sensor function 314 includes a second software function or a function pointer associated with an instruction to call the second software function for reading or parsing performance metric, via block 318, from BMC log files or performance data of block 310. As such, when the BMC causes the IPMI registered functions to initiate, via block 306, the BMC sensor function 314 returns information generated from the second software function instead of hardware sensor information used to retrieve sensor data via block 308 from sensors in blocks 316. In general, the first software function would direct a command to the sensor hardware to secure the sensor data, but for BMC sensor function 314 there is no corresponding hardware sensor to interrogate. Accordingly, in an example of the BMC process flow: the IPMI stack starts, the boot up process initiates, the sensors initiates, and function to read sensors are initiated. The sensors, in an embodiment, are automatically read every second, which is based on information as part of the BMC and/or sensor initialization that indicates how frequently a sensor is desired to be read.

In various embodiments, the BMC sensor function 314 is initialized in the same manner as the hardware sensor functions of function table 312. In a difference from the hardware sensor functions (e.g., index 1 and 2), the BMC sensor function 314 is configured to obtain, convert, and report one or more performance metrics from BMC log files or performance data stored by the BMC. In an aspect of the disclosure, the conversion, mapping or representation referenced herein provides one or more of the performance metrics as sensor data, so that the BMC recognizes the provided performance metric as communicable to a remote requester instead of a local terminal. Accordingly, the BMC sensor software function 314 may be registered as a hardware sensor function in the function table 314. The registration process creates, for example, a sensor name and a sensor number for the first software function as part of the registration process. However, as previously noted, there is no hardware sensor associated with the BMC sensor function 314. Accordingly, instead of the function causing the retrieve sensor data block 308 to obtain data from a hardware sensor (as is the case for the other registered hardware sensor functions), the registered BMC sensor function 314 may include a second software function (also referred to as a callback function) 318. The callback function 318 is configured to instruct the IPMI system to identify relevant BMC log files or performance data, from which the performance metrics that are associated with the BMC sensor function 314 are identified.

When the IPMI reaches the stack instruction to read a BMC sensor function 314, the present implementation of the second software function acts as a call back function to read and/or parse the appropriate BMC log files or performance data 310 to obtain the performance metrics associated with the BMC. For example, in an embodiment, a local terminal may use Linux® commands to interface with the IPMI commands that are recognizable to the BMC. In this manner, the local terminal may query the BMC regarding its status and other information. A remote terminal, however, may merely instruct the BMC to provide sensor data from a remote terminal. As the BMC sensor function 314 is registered in the BMC, the performance metric retrieved from log files or performance is returned as part of the sensor data. The second software function 318 may include a function that is nested within the BMC sensor function 314 and that is configured to parse and map the performance metrics into sensor data to be sent to a remote requestor terminal. The nested or callback function 318 parses log files or performance data based on information provided during registration of the first software function. The BMC sensor function 314 may include a reference to the storage path of the BMC log files or performance data. The OOB communicated instructions to the BMC 209 may be interpreted via the IPMB bridge to provide the IPMI commands in the received instructions to the BMC 209 as IPMB messages. Message responses are similarly provided back for transfer to the remote requester with the command results as data. In an example of the parsing process, the system event log (SEL) of the BMC is interrogated using an IPMI command to retrieve the status indicator bits of the SEL. Alternatively, known bits of the SEL or performance data that correspond to particular system performance metrics, are filtered prior to returning the performance metric in an IPMB message. In a similar manner other log files, interrupts, state or system data of the BMC 209 that were generated during the BMC operations, are parsed and returned as the BMC performance metrics. The returned performance metrics as mapped as sensor data via block 322 and provided with the remaining retrieved sensor data from block 308 (relating to the hardware sensors of block 316) in the outgoing packets 324.

The BMC sensor function 314 is executed in an order, or out of order, from the function table 312. The BMC sensor function is a first software function that includes or is associated with a second software function, illustrated as parsing function for BMC log files in block 318. For example, the parsing function of block 318 may be configured to parse known BMC log files or performance data to identify values corresponding to performance metrics of the BMC. As explained above, the values may be returned as known indicator bits or filtered bits from a system log file. The address or location of the BMC log files or performance data in a memory of the BMC may be coded into the parsing function of block 318. The BMC sensor function 318 may pass the performance metric as a condition or argument of the first software function, when the first software function is identified for running a status update. Similarly, the performance metric indicator bits may be identified and provided in the parsing function of block 318 when the parsing function was registered and initialized. In some embodiments, multiple versions of the BMC sensor function 314 may be configured such that each of the versions of the BMC sensor functions are associated with different performance metrics as designed by an administrator or BMC controller manufacturer. Once the performance metrics are identified, the parsing function of block 318 returns the performance metrics as bit values to the first software function—BMC sensor function 314. The performance metrics may be mapped and/or converted to a format that is associated with sensor data returned by the hardware sensor data that the BMC is configured to identify and transmit remotely as outgoing packets 318. The mapping by block 322 may be implemented by providing the performance metrics in an IPMB message from the first software function of block 314, which the BMC then recognizes as sensor data for the outgoing packets 324. Accordingly, after mapping, the performance metric is mapped, converted, or structured as sensor data of the BMC. Along with the remaining sensor functions—e.g., temperature and fan speed, the performance metrics from the BMC sensor function of block 314 may now be provided as sensor data.

Further, when the other functions in the function table (e.g., temperature functions or fan speed functions) are matched as the functions to initiate, the retrieve sensor data block 308 may be activated to read physical sensors of block 316 for sensor data pertaining to the physical sensors 316. Consequently, the outgoing packets 324 may include retrieved sensor data of block 308 pertaining to the physical sensors of block 316 and the performance metric of the BMC as mapped sensor data of block 322. The BMC treats the sensor data as intended—including providing it via communication interface 210, through port 212, the internet 213, to a remote terminal 214. Accordingly, the BMC performance metric, as the mapped sensor data, may be provided to the outgoing packets 324 as if the performance metric were hardware sensor data, and it may subsequently be transmitted to a remote terminal.

Figure 4:
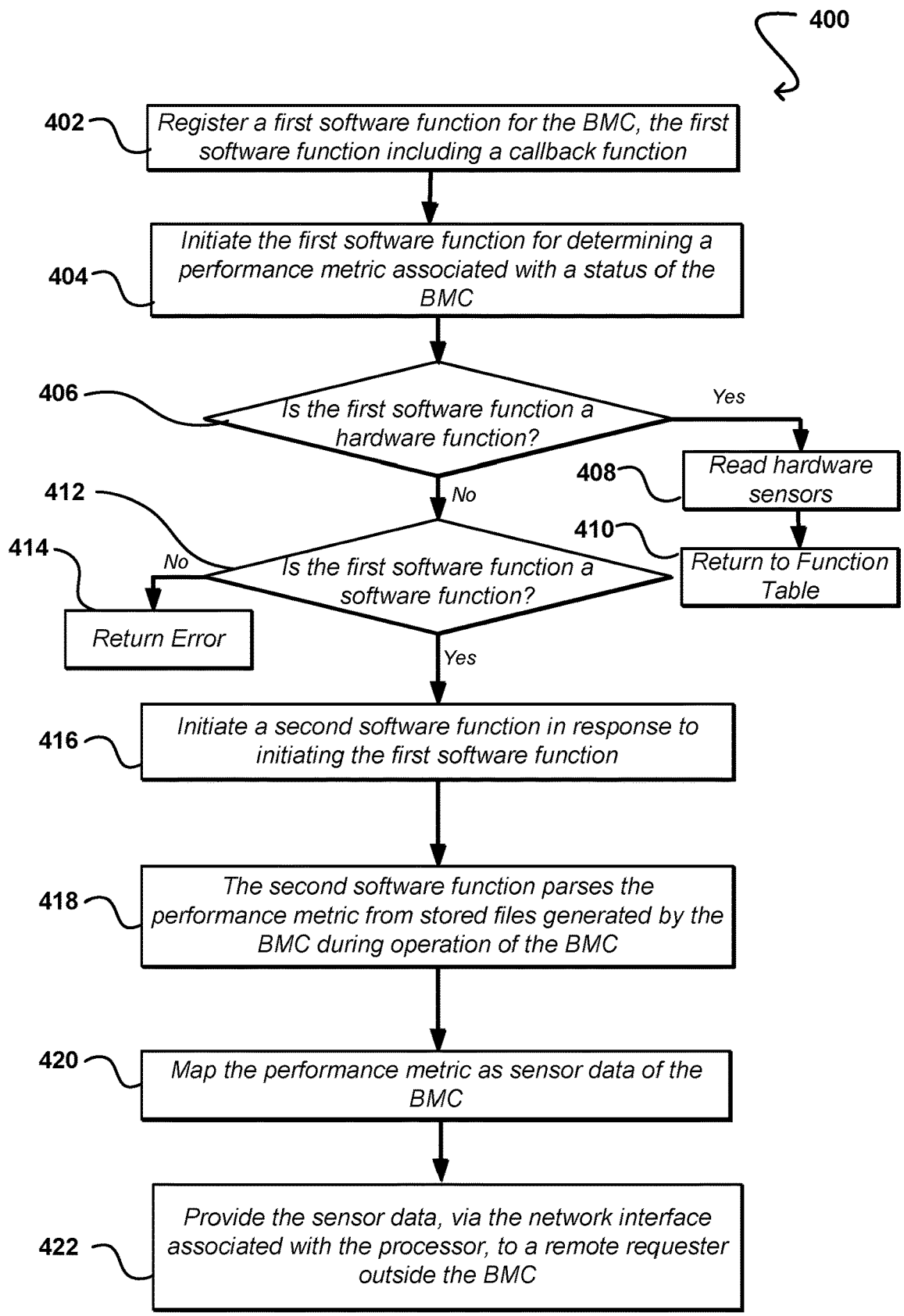
FIG. 4 illustrates an example process for registering and providing software functions to remotely obtain and report performance metrics of a BMC in accordance with an embodiment.

FIG. 4 illustrates an example process 400 for registering and providing software functions to remotely obtain and report performance metrics of a BMC in accordance with an embodiment. The example process 400 is provided merely as an example and additional or fewer steps may be performed in similar or alternative orders, or in parallel, within the scope of the various embodiments described in this specification. The example process 400 is implemented on an example system, as in the example of FIG. 2. Such an example system includes a baseboard management controller (BMC) including a processor and memory. The processor for the BMC is sometimes referred to as a microcontroller or controller. The memory includes instructions that, when executed by the processor, cause the processor to perform functions as provided in example process 400. Block 402 includes a sub-process to register a first software function for the BMC. As previously discussed with reference to FIG. 2, the first software function may be registered prior to booting the BMC, by flashing or hardcoding the memory of the BMC to update the registered sensor function table, for instance. Also as discussed in reference to FIG. 3, the first software function is configured to associate with a second software function as a callback function. Block 404 provides a sub-process to initiate the first software function for determining a performance metric associated with a status of the BMC. In an example, the performance metric is restricted in communication from the BMC via a non-network port.

Sub-process 406 is a determination of whether the first software function in the BMC stack is a hardware function. When, as discussed with respect to FIG. 3, the first software function is identified as hardware function, via block 406, hardware sensors are read via the sub-process of block 408 and the process 400 returns to the function table via block 410. In an aspect, however, a subsequent function of the function table is initiated when a prior function is completed. Consequently, when the first software function is identified as a software function to be executed, via block 412, the process 400 proceeds to sub-process 416. In the event that the first software function is corrected or erroneous for failing to identify as hardware or software function, an error block 414 is provided to log an error and return to the IPMI stack. Sub-process 416 provides initiation of a second software function in response to initiating the first software function. Sub-process 418 is a provision for the second software function to parse the performance metric from stored files generated by the BMC during operation of the BMC. As explained with respect to FIG. 3, the parsing includes searching for system log files or performance data in a known or predetermined location in the BMC memory, filtering the system log files or performance data, and returning status bits corresponding to the performance metrics of the BMC.

Sub-process 420 is a process to map the performance metric as sensor data of the BMC. As previously explained with respect to FIG. 3, the parsed data is provided as a returned argument to the first software function or is provided as bit values that are either transformed or mapped, via the first software function, as sensor data. The returned argument or mapped sensor data represents a structure for the sensor data that is in a format recognizable by the BMC for communicating via a network interface. For example, the structure may include a data structure that is consistent with a sensor data record (SDR) of the IPMI specification. For example, the data structure may include information about the type and number of sensors associated with the record and may be configured to be stored in a SDR repository as if the performance data were read sensor data from a sensor. Alternatively, the parsed data may be returned in any manner that would be in a format recognizable by the BMC for communicating via a network interface. Sub-process 422 provide the sensor data, via the network interface associated with the processor, to a remote requestor, e.g., terminal 214, outside the BMC. As a result of the process of FIG. 4, using a system as in the example system of FIG. 2, the BMC is made to bypass the local communication port 211 because it recognizes sensor data as data available for remote transfer, but recognizes performance metric as restricted to communication via the local communication port 211.

Figure 5:
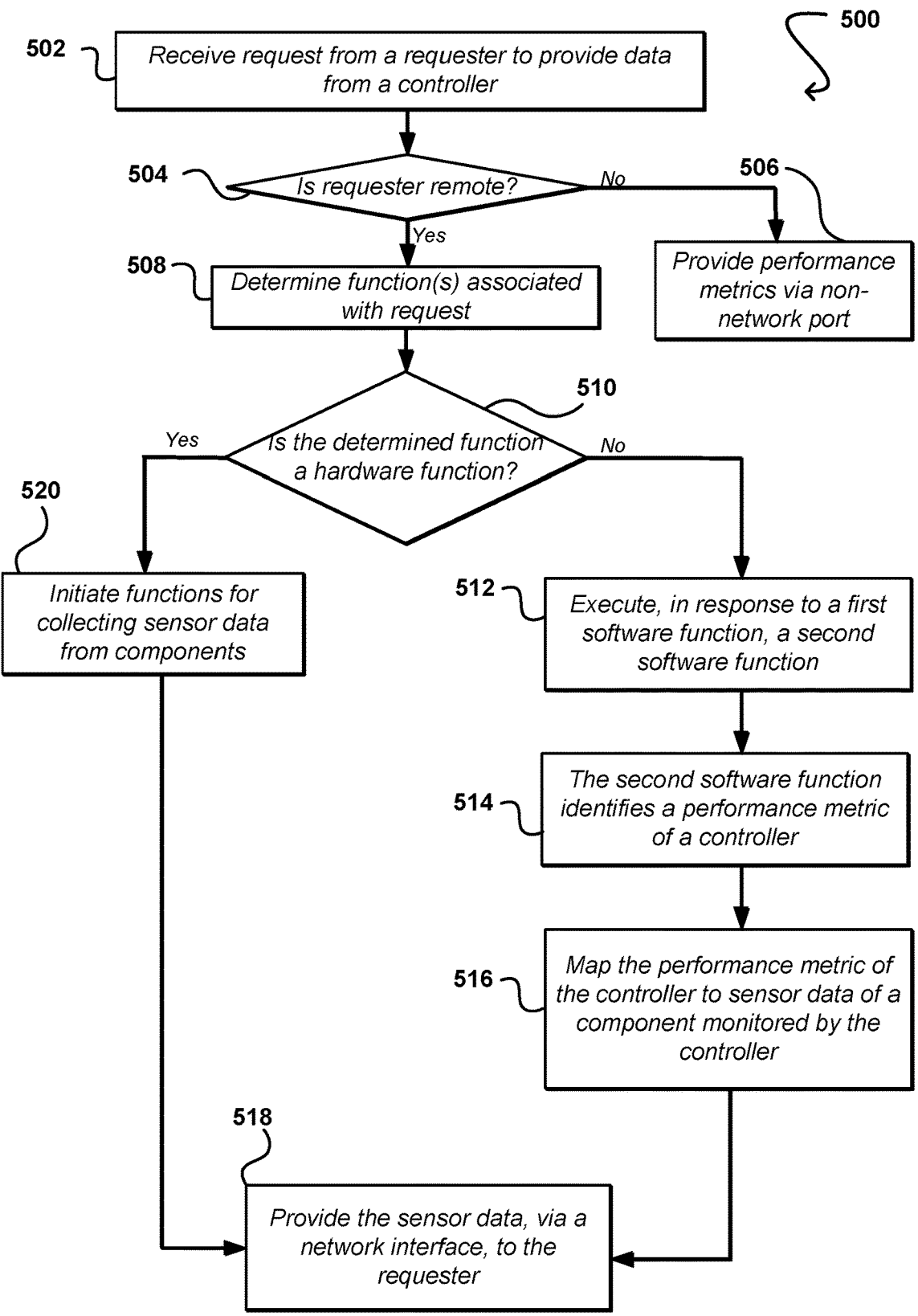
FIG. 5 illustrates another example process for remotely obtaining and reporting performance metric data of a BMC in accordance with an embodiment.

FIG. 5 illustrates another example process 500 for remotely obtaining and reporting performance metric data of a BMC in accordance with an embodiment. The sub-processes 502-520 of process 500 are performed using the system disclosure of FIG. 2. A request from a requestor for data from a controller is provided via sub-process 502. The requestor may be a remote terminal 214 or local terminal

215. Sub-process 504 verifies if the requestor is remote. When the requestor is not remote—e.g., a local requestor, the processor may simply determine that the requested data are performance metrics of the BMC, and may simply provide the performance metrics via the local non-network port to the local terminal 215. When the requestor is remote, then the sub-process 508 runs the request as if it were a request for sensor data of components monitored by the BMC.

Initially, however, sub-process 508 may determine one or more functions to execute or initiate in response to the request using the decision process of sub-process 510. Sub-process 510 matches the request with pertinent functions available as registered functions in the BMC. When the match identifies a function associated with a hardware sensor for fetching sensor data, then sub-process 520 is initiated to collect sensor data from the components. The collected sensor data is provided to the requestor via sub-process 518, which may be to the example remote terminal 214 of FIG. 2. Alternatively, the decision sub-process 510 identifies one or more functions of the request as a BMC sensor function(s)—i.e., a software function to secure BMC performance metrics, as identified from registered sensor information, for example, for a registered first software function. When the match identifies the requested function as a BMC sensor function, then sub-process 512 is initiated. Sub-process 512 executes, via the processor of the BMC, in response to the first software function, a second software function. The second software function, in sub-process 514, identifies a performance metric of the BMC. In an example, the identification is by parsing BMC log files or performance data generated during operation of the BMC. The BMC log files or performance data, as previously described, generally stores CPU usage information, utilization information, and other pertinent performance metric from the BMC, during its operations. Also as previously noted, the performance metric is restricted to communication via a non-network port. In sub-process 516, however, the present method maps the performance metric of the controller (e.g., the BMC) as sensor data. In an example, the mapping is performed by obtaining the performance metric from parsing stored files by the second software function and converting the performance metric to sensor data. In an example, the conversion is by formatting, representing, structuring, or arranging the performance metric as sensor data, such that it is in a format that is recognizable by the controller (via the processor) for communicating via the network interface. Sub-process 518 provides the sensor data externally via the network interface to an external requestor, e.g., remote terminal 214.

In an example implementation, the executing of the first software function in the processor causes the second software function to execute on the processor. Further, the second software function parses stored files associated with the controller to identify the performance metric of the controller. The stored files, as previously noted are operational files created during operation of the controller. In an example, such files include event logs for the controller. In another implementation of example embodiments, the process includes receiving, from a terminal connected to the network interface, the first software function and registering the first software function in a sensor registry of the system. The SDR, previously described, is an example of the sensor registry. In another example, the first software function is formatted as an Intelligent Platform Management Interface (IPMI) function, which the BMC is a controller that is part of an active data or resource center, e.g., resource center 123. In another embodiment, the first software function initiates, as a periodic event, the request for the response, thereby causing execution of the second software function for providing the performance metrics of the BMC as sensor data to a remote requestor.

Figure 6:
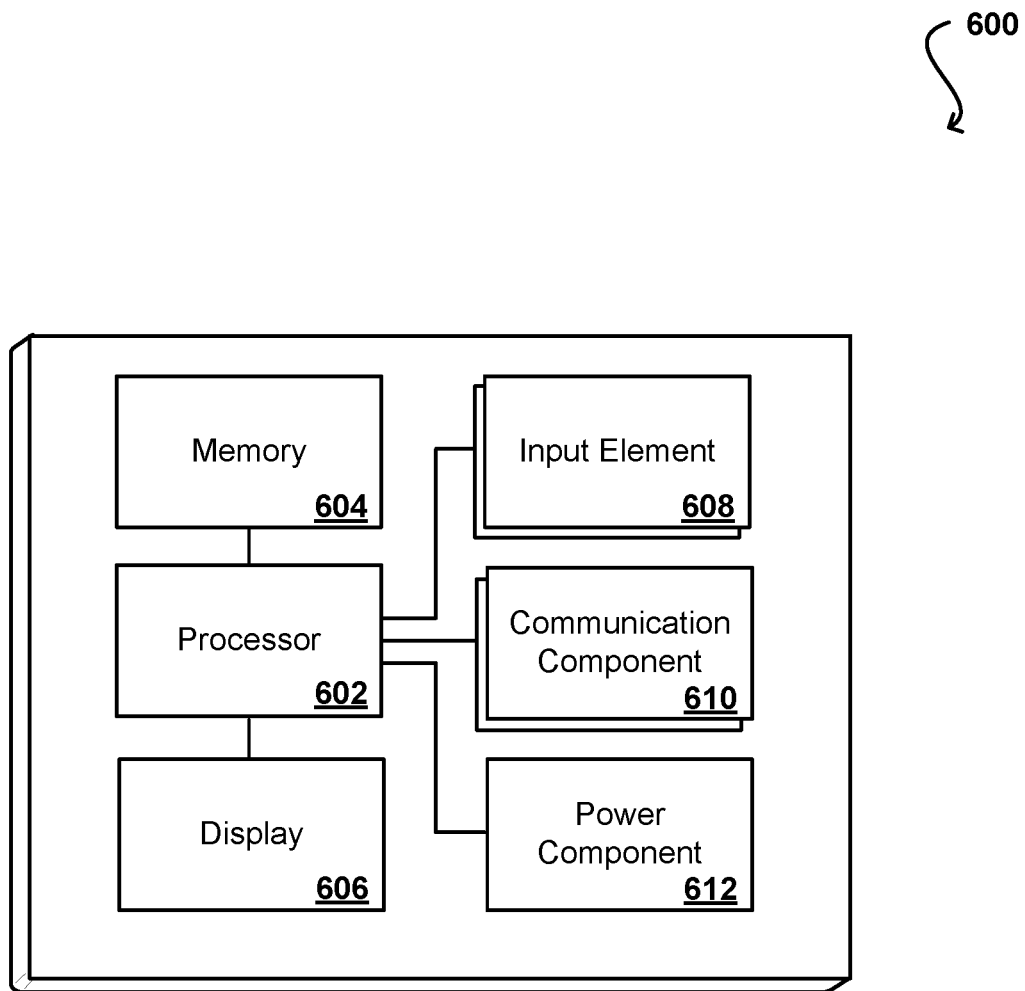
FIG. 6 illustrates an example configuration of components of a computing device for performing the present disclosure in accordance with an embodiment.

FIG. 6 illustrates an example configuration of components 600 of a terminal, e.g., user terminals 214-215, for performing the present disclosure in accordance with an embodiment. In an example user devices 101A-101B may include a remote terminal 214 for performing the remote requests for BMC status. In the example of FIG. 6, physical and logical arrangements of a set of general components 604-612 works in conjunction to provide the functions of user terminals 214-215 described with respect to FIG. 2. In an example, the user terminals 214-215 include a processor 602 for executing instructions that can be stored in a memory device or element 604. As would be apparent to one of ordinary skill in the art, the user terminals 214-215 can include many types of memory, data storage, or non-transitory computer-readable storage media, such as a first data storage for program instructions for execution by the processor 602, a separate storage for images or data, a removable memory for sharing information with other devices, etc. The user terminals 214-215 typically will include at least a type of display element 608, such as a touch screen or liquid crystal display (LCD), although devices such as portable media players might convey information via other means, such as through audio speakers.

As previously discussed, the user terminals 214-215, in many embodiments include at least one input element 608 that is different from the touch aspect of the touch screen. In another embodiment, the user terminals 214-215 of FIG. 2, as illustrated in FIG. 6 include one or more sideband, OOB, or other such communication elements, such as a Wi-Fi®, Bluetooth®, radio frequency (RF), or another wireless communication system, enabling the user device to communicate with other devices or components, such as a charger or docking station. In some embodiments the inputs of the user terminals 214-215 include, for example, a push button, touch pad, touch screen, wheel, joystick, keyboard, mouse, keypad, or any other such device or element whereby a user can input a command to the device. In an aspect, however, such user terminals 214-215 might not include any buttons at all, and might be controlled only through a combination of visual and audio commands, such that a user can control the device without having to be in contact with the device.

The example device 600 also includes a battery or power component, or any other appropriate power source 612. The power source 612 includes, for example, at least one rechargeable battery, and can include other elements as well such as solar power cells or other such elements. The user terminals 214-215 also can include an intelligent charging port or switch that is different from local communication port 211 and OOB communication port 212; and in at least some embodiments the intelligent charging port or switch is controllable by the processor 602. The device might be plugged into an outlet or placed into a charging station, for example, but in at least some embodiments the charging switch within power component 612 can control whether or not power is actually passed on to the battery for purposes of charging. For example, if the battery has almost no remaining charge then the switch might close in order to allow power to charge the battery, while in the case of a battery 612 such function is part of the power component 612. When user terminals are nearly fully charged, the charging switch might open such that no charge passes to the battery at the current time. In an embodiment, a user can override such settings, whereby the device might always accept a charge or only accept a charge upon certain user settings, etc. An example device also can include at least one power management module, which can be implemented in software and/or hardware, via power component 612, and is in communication with, or executed by, at least one processor 602 of the device 200. In at least some embodiments, the power management module of power component 612 monitors various aspects of the device, and its usage by a user, to determine when to adjust a functional state of at least one component of the device. The various aspects are monitored using a different BMC than described above, for example.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

In an example where a non-transitory computer-readable storage medium is used to provide the present embodiments, it may be implemented as following. The non-transitory computer-readable storage medium include instructions that, when executed by a processor, cause the processor to perform functions. For example, the memory of the BMC, either integrated or incorporating multiple discrete components includes internal and/or external components of the BMC, such as a sensor data registry (SDR).

In a function stored in the memory, the function provides execution, in response to a first software function, of a second software function in the processor. The second software function, as previously described, is configured to identify a performance metric of a controller comprising the processor. The identification may be by parsing the performance metrics from an event log file of the BMC or controller. The performance metric is recognized by the processor as being restricted to communication via a non-network port. In the memory of the non-transitory computer-readable storage medium are also instructions to map the performance metric of the controller as sensor data of a component monitored by the controller. As previously explained the mapping is by passing as an argument, formatting, representing, structuring, or arranging the performance metric such that the BMC recognizes it as sensor data for a component that the BMC monitors. When the BMC recognizes the performance metrics as sensor data, it may then provide the sensor data, via a network interface, to an external requestor.

In another implementation using the non-transitory computer-readable storage medium, the first software function is registered in a sensor registry associated with processor. Further, the first software function is registered as associated with a component of the BMC. In another implementation of the non-transitory computer-readable storage medium, the instructions in the memory when executed further cause the processor to parse stored files associated with the controller to identify the performance metric of the controller.

The non-transitory computer-readable storage medium also supports that the first software function initiates, as a periodic event, a request for the response to execute the second software function. Accordingly, the BMC is configured to automatically trigger the second software function to identify performance metrics and to provide these performance metrics as sensor data to a remote requestor.

As discussed above, in the various embodiments, terminals to access the mapped sensor data and the performance metrics can be implemented in a wide variety of operating environments, which in some cases can include one or more user computers, computing devices or processing devices which can be used to operate any of a number of applications. User or client computing devices can include any of a number of general purpose personal computers, such as desktop or laptop computers running a standard operating system, as well as cellular, wireless and handheld devices running mobile software and capable of supporting a number of networking and messaging protocols. Such a computer is further enabled using the systems and methods (e.g., with software improvements) discussed throughout this disclosure. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Where a system includes the terminals described herein, each such device can include hardware elements that may be electrically coupled via a bus, the elements including, for example, at least one central processing unit (CPU), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Many embodiments utilize at least one network that would be familiar to those skilled in the art for supporting communications using any of a variety of commercially-available protocols, such as Transmission Control Protocol/Internet Protocol (TCP/IP), Open Systems Interconnection (OSI), File Transfer Protocol (FTP), Universal Plug and Play (UPnP), Network File System (NFS), Common Internet File System (CIFS), and AppleTalk. The network can be, for example, a local area network, a wide-area network, a virtual private network, the Internet, an intranet, an extranet, a public switched telephone network, an infrared network, a wireless network and any combination thereof.

The host machines, as previously described, can also include a computer-readable storage media reader, a communications device (e.g., a modem, a network card (wireless or wired), an infrared communication device, etc.) and working memory. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, electrically erasable programmable read-only memory (EEPROM), flash memory or other memory technology, compact disc-read only memory (CD-ROM), digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A system comprising:
a baseboard management controller (BMC) comprising a network interface, a non-network communication port, one or more processors, and memory, the memory including instructions that, when executed by the one or more processors, cause the one or more processors to:
register a first software function for the BMC, the first software function being an Intelligent Platform Management Interface (IPMI) standard function and including a second software function as a callback function;
use the first software function to determine a performance metric associated with a status of the BMC, wherein the BMC is configured to communicate the performance metric only via the non-network communication port;
use the second software function to identify the performance metric from performance data generated by the BMC during operation of the BMC;
use a function nested within the second software function to parse and provide the performance metric as sensor data of the BMC, the sensor data having a format recognized by the BMC to enable the BMC to transmit the performance metric, provided as the sensor data, to outgoing packets; and
provide the sensor data, via the network interface, to a remote requestor.

2. The system of claim 1, wherein the instructions, when executed by the processor, further cause the one or more processors to:
detect a boot process of the BMC; and
determine registration of a one sensor of the BMC.

3. The system of claim 1, wherein the one or more processors are configured to recognize the performance metric as restricted for communication to a local requestor via the non-network communication port, and to recognize the sensor data as available for transfer to the remote requestor via the network interface.

4. The system of claim 1, wherein mapping the performance metric as sensor data of the BMC comprises:
obtaining the performance metric from parsed performance data by the second software function, the performance data generated during operation of the controller; and
converting the performance metric to the sensor data.

5. A computer-implemented method, comprising:
executing, in response to a first software function, a second software function in one or more processors, wherein the second software function identifies a performance metric of a controller comprising the one or more processors, the performance metric restricted by the controller to communication via a non-network port of the controller;
using a function nested in the second software function to parse and provide the performance metric of the controller as sensor data of a component monitored by the controller, the sensor data having a format recognized by the controller to enable the controller to transmit the performance metric, provided as the sensor data, to outgoing packets; and
providing the sensor data, via a network interface of the controller, to an external requestor.

6. The computer-implemented method of claim 5, further comprising:
executing the first software function in the one or more processors, thereby causing the second software function to execute on the one or more processors; and
parsing, by the second software function, performance data associated with the controller to identify the performance metric of the controller.

7. The computer-implemented method of claim 5, wherein the mapping of the performance metric comprises:
obtaining the performance metric from parsed performance data by the second software function, the performance data generated during operation of the controller; and
converting the performance metric to sensor data, wherein the sensor data comprises a format recognizable by the controller for communicating via the network interface.

8. The computer-implemented method of claim 5, wherein the first software function includes a callback function, the callback function being the second software function.

9. The computer-implemented method of claim 5, further comprising:
receiving a terminal instruction from the external requester for the performance metric of the controller; and
executing the first software function in response to the terminal instruction.

10. The computer-implemented method of claim 9, wherein the first software function is registered as representing a hardware sensor in a sensor registry of the controller.

11. The computer-implemented method of claim 5, wherein an association between the first and second functions is stored in a table in the controller.

12. The computer-implemented method of claim 5, wherein the first software function is formatted as an Intelligent Platform Management Interface (IPMI) function.

13. The computer-implemented method of claim 5, wherein the controller is a baseboard management controller (BMC).

14. The computer-implemented method of claim 5, wherein the first software function initiates, as a periodic event, a request for the response to execute the second software function.

15. The computer-implemented method of claim 5, wherein the performance metric includes at least one of usage of a processor, utilization of a processor, or memory status information.

16. A non-transitory computer-readable storage medium including instructions that, when executed by one or more processors, cause the one or more processors to:
    execute a first software function in a controller comprising the one or more processors;
    execute, in response to the first software function, a second software function to identify a performance metric of the controller, wherein the controller is configured to send the performance metric via a non-network port of the controller;
    use a function nested in the second software function to parse and provide the performance metric of the controller as sensor data of a component monitored by the controller, the sensor data having a format recognized by the controller to enable the controller to transmit the performance metric, provided as the sensor data, to outgoing packets; and
    send the sensor data via a network interface of the controller instead of via the non-network port.

17. The non-transitory computer-readable storage medium of claim 16, wherein the first software function is registered in a sensor registry associated with the processor.

18. The non-transitory computer-readable storage medium of claim 16, wherein the mapping the performance metric comprises:
    parsing, by the second software function, performance data associated with the controller to identify the performance metric of the controller; and
    converting the performance metric to sensor data as part of the map process for the performance metric.

19. The non-transitory computer-readable storage medium of claim 16, wherein the first software function initiates, as a periodic event, a request for the response to execute the second software function.

20. The non-transitory computer-readable storage medium of claim 16, wherein the performance metric includes at least one of usage of a processor, utilization of a processor, or memory status information.

* * * * *